United States Patent [19]

Burwell

[11] Patent Number: 4,679,206

[45] Date of Patent: Jul. 7, 1987

[54] ELECTRODE JOINT THREAD FORM

[75] Inventor: William H. Burwell, Olmstead Falls, Ohio

[73] Assignee: Union Carbide Corporation, Danbury, Conn.

[21] Appl. No.: 875,252

[22] Filed: Jun. 17, 1986

Related U.S. Application Data

[63] Continuation-in-part of Ser. No. 734,107, May 15, 1985.

[51] Int. Cl.⁴ .............................................. H05B 7/14
[52] U.S. Cl. ..................................... 373/91; 403/296; 403/DIG. 5
[58] Field of Search .................... 373/91, 92; 403/296, 403/343, DIG. 5

[56] References Cited

U.S. PATENT DOCUMENTS 4,349,910 9/1982 Belz ........................................ 373/91

FOREIGN PATENT DOCUMENTS 1076845 3/1960 Fed. Rep. of Germany ........ 373/92

OTHER PUBLICATIONS

Manufactured Graphite Electrodes, NEMA Standards Pub. No. CG-1-1982, pp. 1-10.

Primary Examiner—Roy N. Envall, Jr.
Attorney, Agent, or Firm—C. F. O'Brien

[57] ABSTRACT

The probability of thread damage during the joining of carbon or graphite electrodes having tapered threaded projections or sockets is reduced by an improved thread configuration wherein the thread crest angle is less than the taper angle of the threaded projection or socket. In the preferred embodiment the thread crest is essentially parallel to the electrode axis.

14 Claims, 9 Drawing Figures

FIG. I
(PRIOR ART)

ELECTRODE JOINT THREAD FORM

This application is a continuation-in-part of prior U.S. application Ser. No. 734,107, filed May 15, 1985.

FIELD OF INVENTION

This invention relates generally to carbon or graphite electrodes for electric arc furnaces and more specifically to a new and improved thread form for joining electrode sections.

BACKGROUND OF THE INVENTION

Electrodes used in electric arc furnaces are usually made of carbon or graphite and comprise discrete sections joined together to form an electrode column. The joining of these electrode sections in electric arc furnaces is typically by means of threaded portions formed in the section ends. The threads on these end portions which combine to make a joint are made of the same material as the electrodes themselves. In many applications, it has become standard to use a tapered threaded joint for its superior strength.

The threaded joint between electrode sections may consist of a tapered threaded projection formed on one end of an electrode section and connected to a complimentarily tapered threaded socket formed in one end of another (male-female). It may also consist of a double ended tapered threaded nipple or connecting pin joining two electrode sections each having complimentarily tapered threaded sockets formed in an end. The taper angle has typically been 9.46° in standard electrode connecting pin joint configurations. National Electrical Manufacturers Association (NEMA) Standards Publication no. CG 1-1982 discloses this taper for threaded electrode ends of various sizes. Higher taper angles are generally used for male-female joints, typically from approximately 16° to 35°. As used herein, "taper angle" refers to the included angle between a straight line running along the top surface of the threads and the longitudinal center line axis of the electrode.

If the thread profile of a threaded projection or socket is viewed in cross-section, it will be generally seen to have straight thread crests and flanks, and curved thread roots. As used herein, "cross-section" refers to a plane section through the electrode which includes the longitudinal centerline axis of the electrode. Since the commercial introduction of tapered threaded carbon-graphite electrode joints, the thread crest angle has been the same as the taper angle of the threaded projection or socket. As used herein, "thread crest angle" refers to the included angle between the thread crest cross-section and the longitudinal electrode axis. It appears that this configuration was selected because of the ease of fabrication of thread cutting tools and the limitations of previously existing machinery. Graphite electrode thread crests having an angle equal to the taper of the projection or socket are disclosed in the aforementioned NEMA publication no. CG 1-1982. The present invention relates to the unique problems associated with carbon-graphite electrode threaded joints and the selection of thread crest configurations which overcome these problems.

Typically, electrode columns made up of joined electrode sections will project through the roof of electric arc furnaces and into the furnace chamber where an arc will be struck. The portion of the electrode column within the furnace chamber can be a single electrode section or it can be a number of electrode sections joined by the threaded joints describe above. During operation of the furnace, the electrode column is consumed from the bottom end at which the arc emanates. Because it is necessary to maintain a controlled arc length, the electrode column must be fed down into the furnace to compensate for the electrode consumption. Adequate electrode column length is assured by adding new electrode sections to the top of the electrode column which protrudes from the furnace roof.

The joining of electrode sections in a mill environment is often performed without the aid of sophisticated devices. A mill operator will first suspend a fresh electrode from a crane and axially align the fresh electrode over the electrode column section protruding from the furnace roof. The operator will then longitudinally downwardly advance the fresh electrode toward the electrode column. In one method of joining, the operator will lower the fresh electrode without rotation until its threads make contact with the threads of the electrode column section. He will then commence to screw the two electrodes together. In another method of joining, the operator will commence rotating the fresh electrode about its longitudinal axis before the threads make contact to screw the electrodes together.

The operator normally rotates the fresh electrode manually with the aid of an electrode turning fixture, for example, a chain wrench. The operator may also utilize a threaded stem device between the crane and the fresh electrode which, when fitted with a screw thread that has the same pitch as that of the threaded joints, allows the operator to longitudinally advance and rotate the fresh electrode toward the electrode column at the exact rate of advancement of the electrode threads.

Even with the aid of a crane and turning devices, the joining of the threaded electrode section ends does not always proceed smoothly. The great size and weight of the electrode sections (up to 28 inches diameter and 4200 lbs weight for graphite electrodes, and 55 inches diameter and 15,000 lbs. weight for carbon electrodes) necessitate the use of large cranes or hoists which generally have imprecise controls and which therefore cannot locate the section with a great deal of precision. In addition, because tapered threads are used, the threaded projection of one electrode must be inserted deep into the threaded socket of the other electrode and out of easy view of the operator before the threads align and mate. The result of this practice is that the joining of the complimentarily threaded section ends is accomplished with much repositioning and inadvertent bumping and scraping between the threads at each end. This can lead to thread breakage.

The aforementioned problem of inadvertent bumping and scraping and possible breakage of threads can occur even if the two electrode sections to be joined are held in perfect axial alignment during joining. This may occur if the properly aligned fresh electrode section is advanced toward the electrode column with or without rotation of the fresh electrode section about its longitudinal axis. The thread crest of one electrode may not properly mate with the thread root of the other electrode and instead the thread crests of the two electrodes may become jammed, i.e., locked in wedged engagement with each other. It may also occur if the threaded stem is used and advancement and rotation are not begun with the proper longitudinal distance between complimentary thread points (the center of a thread crest on the projection and the center of a thread root in the socket, for example). If this distance is not equal to an integer multiple of the electrode thread pitch, thread crests of the projection and socket may become jammed.

At this point in the process, the operator is faced with the problem of freeing the jammed threads. Because of the difficulty of reversing a chain wrench (the usual electrode turning fixture) and the great force required, the operator will not normally attempt to unscrew the overhead fresh electrode. More commonly, the operator will use the crane to jog the upper fresh electrode up or down relative to the electrode column to unjam the thread crests. Once the threads are unjammed, the process is restarted and the fresh electrode is again moved in an attempt to align the thread crests and roots in proper longitudinal relationship. When the thread crests and roots of the two electrode sections are correctly aligned, they may be screwed together properly.

Since the threads (and the electrodes) are made of carbon or graphite which are relatively fragile materials as compared to metals, jogging the electrodes to free jammed threads can cause fragments of the threads to break off. If this occurs, one resulting problem is that the thread strength of the joint is weakened. An even greater problem arises if the thread fragments are trapped between the two threaded sections, preventing proper engagement of mating threads. This can easily occur when, as is normally the case, the fresh electrode section overhead has the threaded projection (either integral with the electrode section or as a threaded connecting pins screwed into a threaded socket) and the end of the electrode column below and protruding from the roof contains the threaded socket. Fragments can still be trapped if the positions of the thread projection and socket are reversed. The faulty connection will result in, among other things, an increase in electrical resistance which causes excess heating and thermal stress. Electrode column vibration during furnace operation may result in further problems by causing the trapped thread fragments to break into smaller pieces, thereby loosening the joint. The loose joint will be weak and susceptible to full unscrewing of the lower column section.

OBJECT OF THE INVENTION

It is an object of the present invention to improve the carbon-graphite electrode thread configuration so as to reduce the possibility of thread breakage during joining. A further object of the invention is to accomplish this without adversely affecting joint strength or joint conductivity.

SUMMARY OF THE INVENTION

In one aspect, the present invention relates to a carbon or graphite electrode having a tapered threaded projection or socket on an end and thread flank angles greater than zero, the thread crest angle being less than the taper angle of the tapered threaded projection or socket relative to the electrode axis.

In another aspect, the present invention relates to a double ended tapered threaded carbon or graphite connecting pin for joining two electrodes, the thread flank angles being greater than zero and the thread crest angle on at least one end of the pin being less than the taper angle of the pin relative to the pin longitudinal axis.

The thread crest of the aforementioned electrode or connecting pin is preferably essentially parallel to the axis or has a negative angle relative to the axis. More preferably, the thread crest cross-section is essentially parallel to the axis.

In a further aspect, the present invention relates to a method for joining a first carbon or graphite electrode having a tapered threaded projection on an end to a second carbon or graphite electrode having a tapered threaded socket in an end, the thread crest of each of the electrode ends being essentially parallel to the electrode axis or having a negative angle relative to the longitudinal axis of the electrode, the method comprising the steps of:

(a) axially aligning said first and second electrodes, (b) longitudinally advancing at least one of said electrodes toward the other electrode until the thread crest of said first electrode contacts the thread crest of said second electrode, (c) further longitudinally advancing at least one of said electrodes toward the other electrode until the thread crest of one electrode is in approximate longitudinal alignment with the thread root of the other electrode, and (d) still further longitudinally advancing at least one of said electrodes toward the other electrode while simultaneously rotating at least one of said electrodes relative to the other electrode about the electrode axis, the rates of said still further advance and rotation being coordinated to be the equivalent of the advancement of the electrode threads, until the threaded projection of said first electrode is screwed fully into the threaded socket of said second electrode.

DETAILED DESCRIPTION OF THE INVENTION

Figure 1:
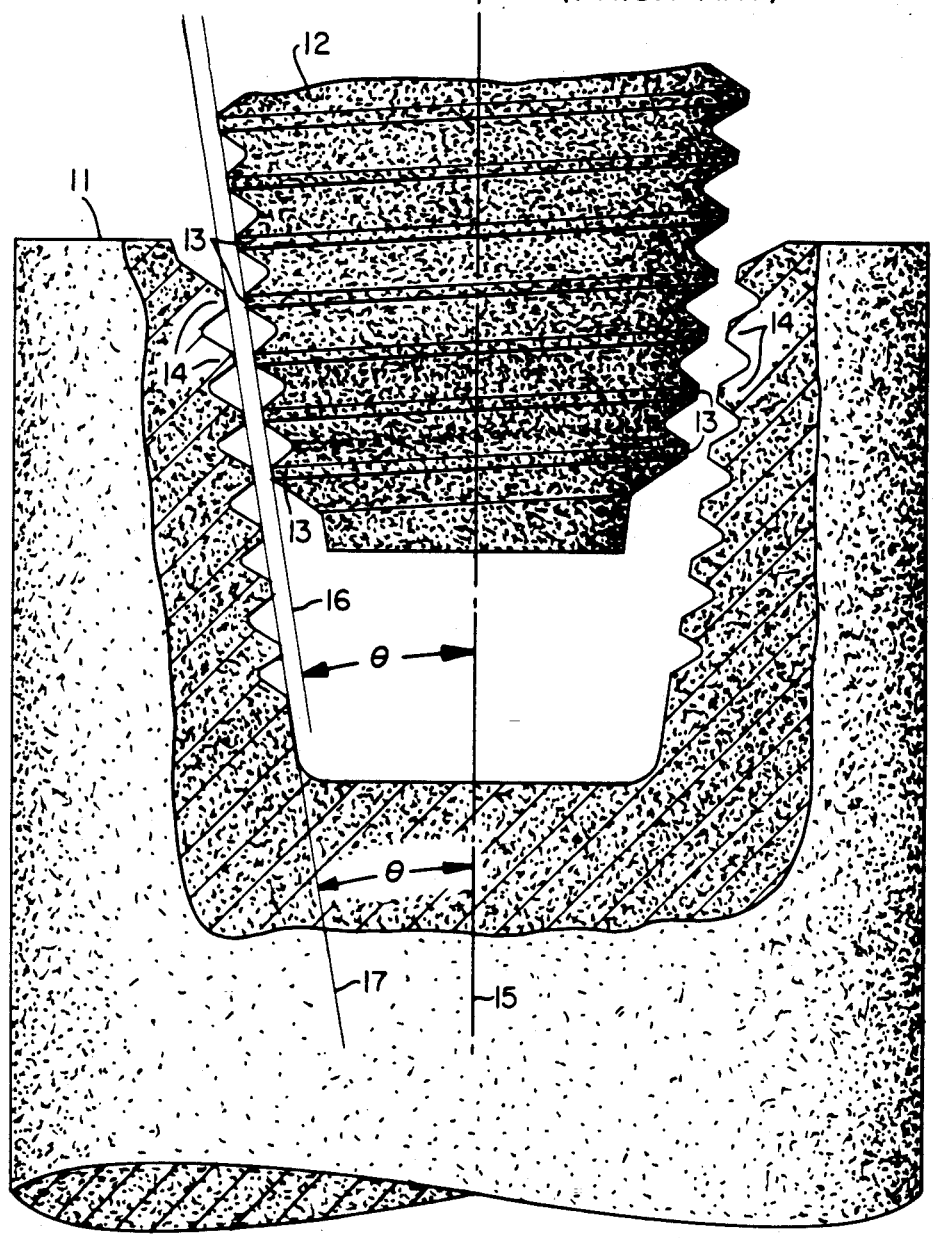
FIG. 1 illustrates the carbon-graphite electrode thread configuration of the prior art in a cross-sectional view of two complimentary threaded electrode ends in spaced axial alignment prior to being screwed together.

FIG. 1 illustrates the thread configuration of the prior art in a cross-sectional view of the two complimentary threaded electrode ends in spaced axial alignment prior to being screwed together. A threaded projection 12 is shown partially inserted into a threaded socket 11. The threaded projection may be formed in an end of an electrode or it may be a projecting end of a double ended tapered threaded connecting pin screwed into a complimentary threaded electrode socket. The projection threads 13 and socket threads 14 are complimentary and are of the prior art carbon-graphite electrode thread configuration. The axes of threaded socket 11 and threaded projection 12 are coincident and are shown as electrode axis 15. Reference line 16 is drawn along the tops of the projection threads 13 and shows the taper angle $\theta$ of the projection with respect to axis 15. Reference line 17 is drawn along the tops of the socket threads 14 and shows the same taper angle $\theta$ with axis 15.

Figure 2:
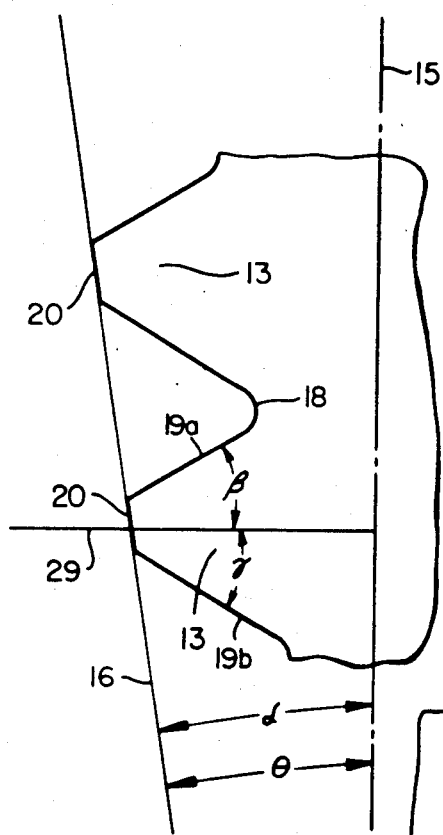
FIG. 2 is an enlargement of an area of FIG. 1 showing thread detail.

FIG. 2 is an enlargement of the area indicated in FIG. 1 and shows the projection thread detail. Reference line 16 again shows the taper angle $\theta$ with respect to axis 15. Each thread 13 is seen to have a rounded thread root 18, straight thread flanks 19a and 19b, and a straight thread crest 20. A reference line drawn along the thread crest 20 will be coincident with reference line 16 which forms the taper angle $\theta$ with axis 15. In this prior art carbon-graphite electrode thread configuration, the thread crest angle $\alpha$, the included angle between the thread crest and the electrode axis, is equal to the taper angle $\alpha$.

Reference line 29 bisects one of the threads 13 and is perpendicular to the electrode column axis 15. Upper thread flank 19a and lower thread flank 19b form thread flank angles $\beta$ and $\gamma$, respectively, with line 29. Both $\beta$ and $\gamma$ are greater than zero. In standard electrode thread design, thread flank angles $\beta$ and $\gamma$ are greater than zero and are equal. The aforementioned NEMA Standards Publication no. CG 1-1982 discloses thread flanks angles for tapered threads wherein $\beta = \gamma = 30°$.

Figure 3:
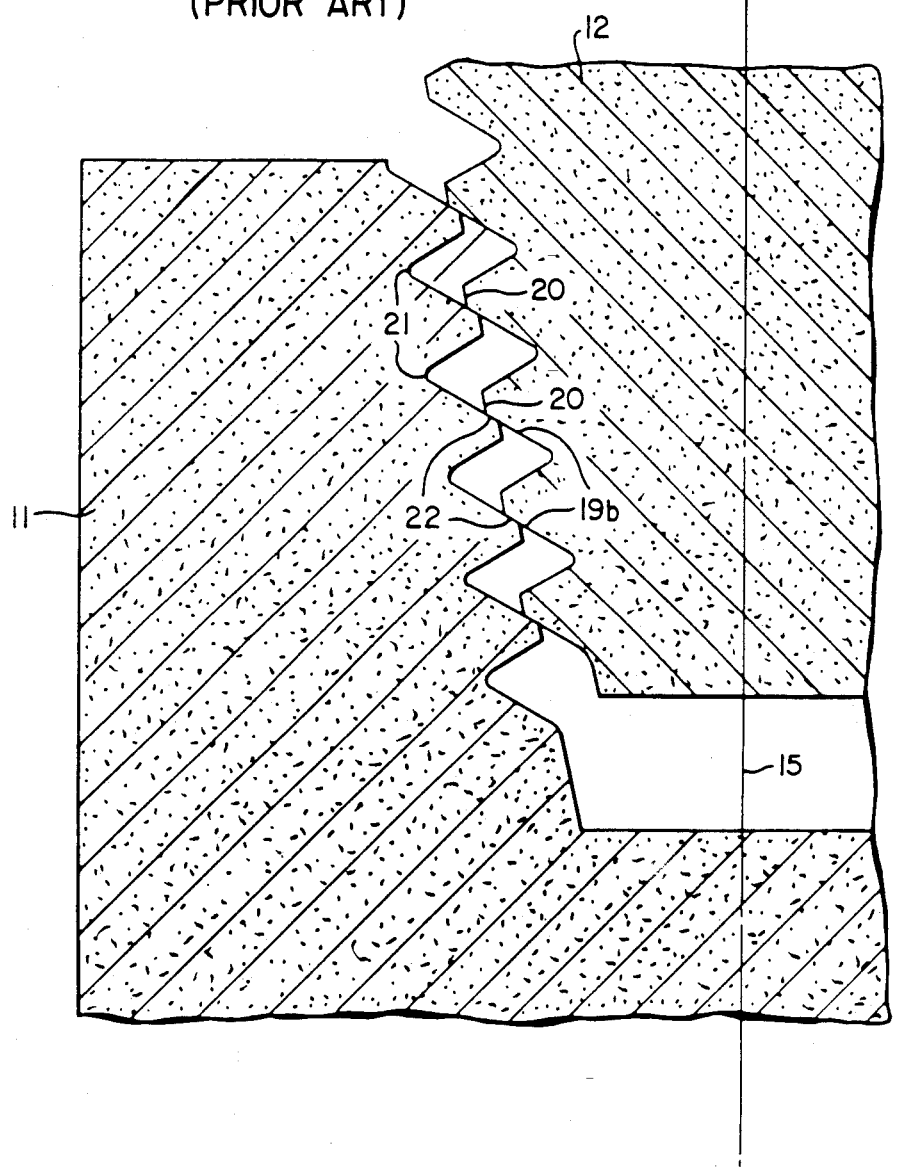
FIG. 3 illustrates properly aligned threads of the FIG. 1 prior art electrode ends prior to full thread engagement.

FIG. 3 illustrates properly aligned threads of a tapered threaded projection 12 and socket 11 of the FIG. 1 thread configuration prior to full thread engagement. In the properly aligned joint, the projection thread crests 20 will be in approximate longitudinal alignment to mate with the complimentary thread roots of the socket 21. There will be no possibility that as the electrode sections are screwed together, the thread crests can become jammed, i.e., locked in wedged engagement so that further rotation is impeded. The lower thread flanks of the projection 19b may rest on the upper thread flanks of the socket 22, as shown in FIG. 3. When the threaded projection is longitudinally advanced toward the socket and rotated about the electrode axis, it will screw smoothly into the socket.

Figure 4:
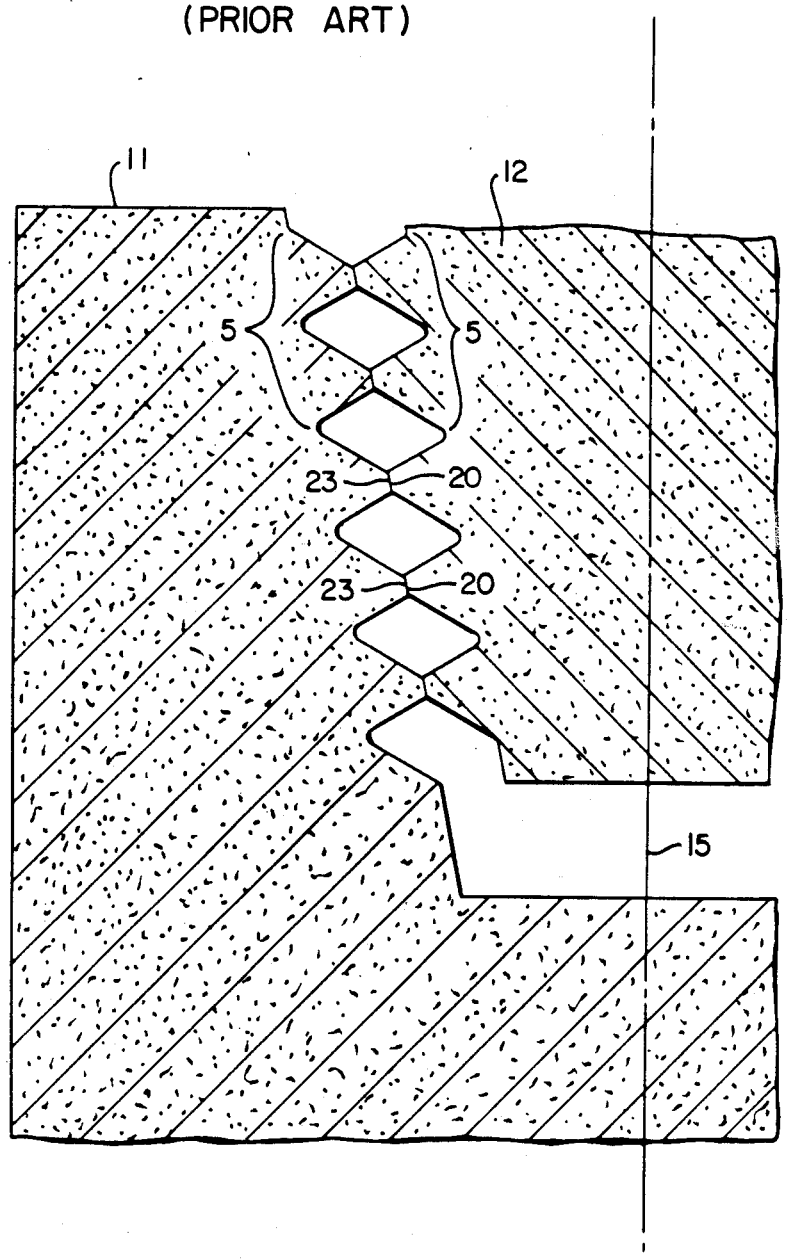
FIG. 4 illustrates thread crest jamming in improperly aligned prior art electrode ends.

FIG. 4 illustrates a typical problem of thread crest jamming between the threaded socket 11 and projection 12 which occurs with the prior art thread configuration. The threaded projection 12 has been longitudinally moved relative to the threaded socket 11—either with or without one electrode being rotated relative to the other about the electrode axis 15—and the projection thread crests 20 have not longitudinally aligned and mated with the complimentary socket thread roots 21. Instead, the projection thread crests 20 are in tight contact with the socket thread crests 23. This jamming of the respective thread crests prevents further rotation of one electrode relative to the other to screw the electrodes together.

Figure 5:
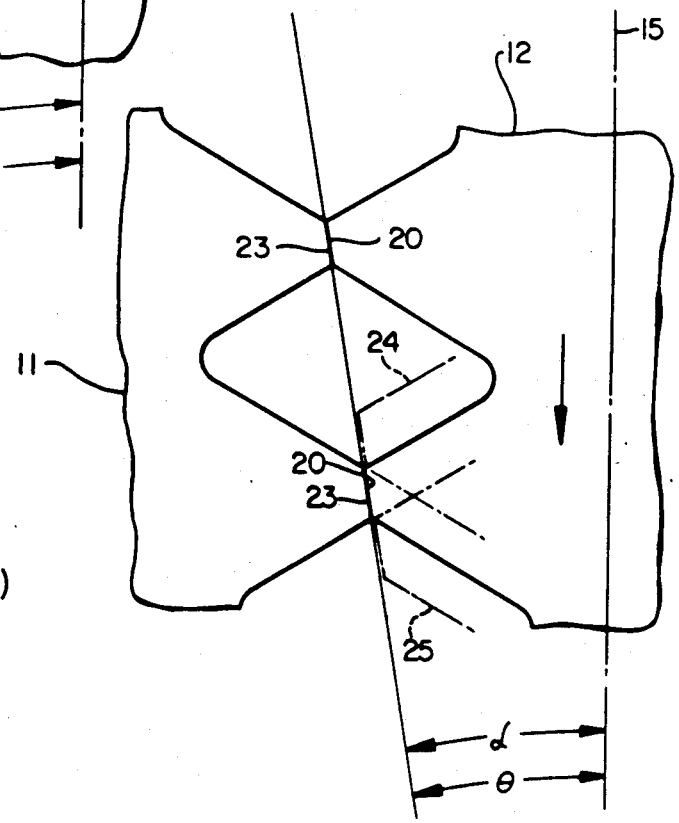
FIG. 5 is an enlargement of an area of FIG. 4 showing thread crest detail.

FIG. 5 is an enlargement of the indicated portion of FIG. 4 showing thread crest jamming. The thread crests of the projection and socket, 20 and 23 respectively, are in tight contact with one another. The thread crest angle $\alpha$ and the taper angle $\delta$ with respect to electrode axis 15 are equal. Because the jammed thread crests have the same angle as the taper angle, the threaded projection 12 cannot be advanced longitudinally toward the threaded socket in the direction of the arrow without the possibility of thread breakage. Further, if the electrodes are in the conventional vertical alignment, the upper electrode can be wedged downward toward the lower electrode by its own weight. Thread breakage is then also possible if the threaded projection 12 is moved away from the socket 11 in the direction opposite the arrow.

The vertical length of the thread crest is generally about one-fifth (20%) of the pitch of the thread. The dashed line thread profiles show the upper 24 and lower 25 limits of thread crest interference between the threaded socket and projection. If the upper electrode is axially aligned with and randomly rotationally oriented respective to the lower electrode, there will be an approximately 40% probability that thread crest interference and jamming will occur as the two electrodes are brought together. This is true whether or not the upper electrode is simultaneously rotated about its axis to the equivalent of the advancement of the electrode threads. Thus, there is a relatively high probability of thread jamming occurring during joining, and given the thread configuration of the carbon-graphite electrode prior art, a significant chance of thread breakage.

Figure 6:
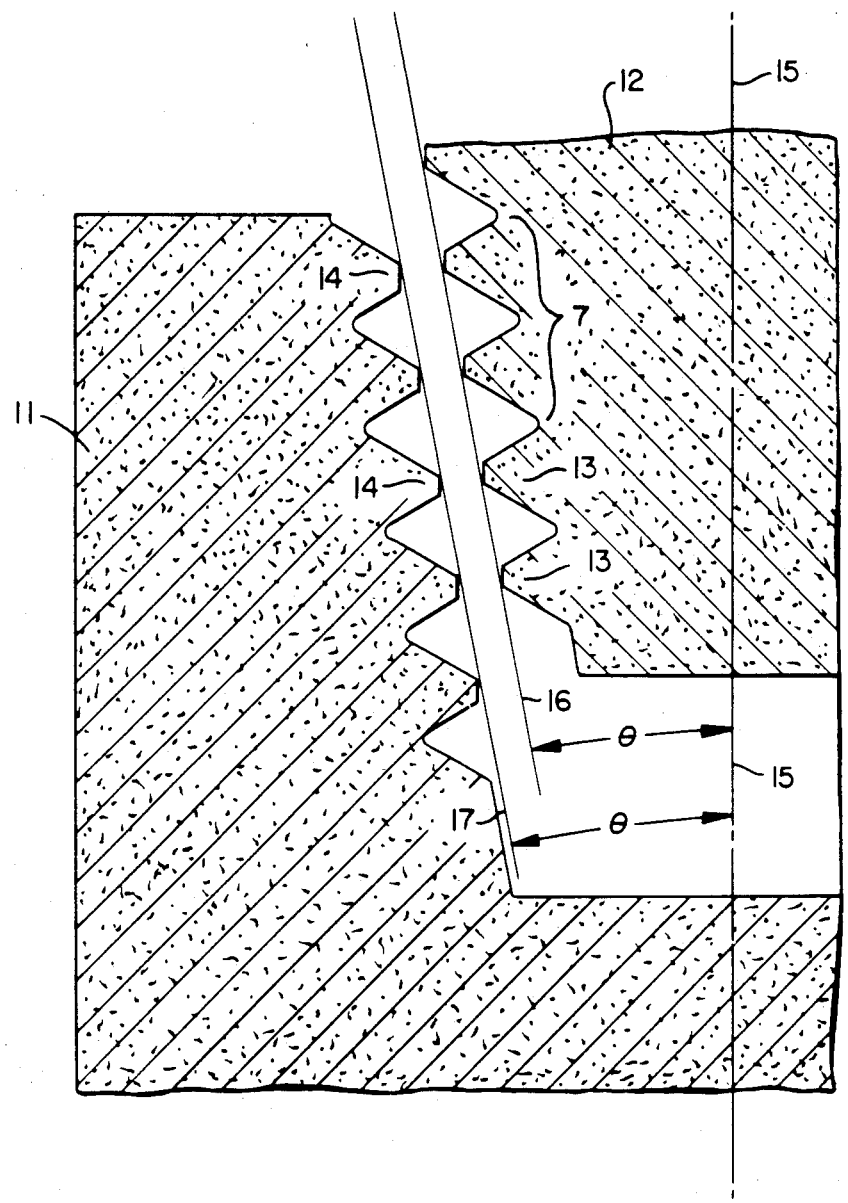
FIG. 6 illustrates two complimentary threaded electrode ends having the preferred embodiment of the thread configuration of the present invention in spaced axial alignment prior to being screwed together.

FIG. 6 illustrates two complimentary threaded electrode ends in spaced axial alignment, each electrode end having the thread configuration of the present invention. The threaded projection and socket taper angle $\theta$ is the same as the aforedescribed prior art, as are the thread pitch, thread flank (including thread flank angles), and the thread root forms. In accordance with the present invention, however, the thread crest angle is less than the taper angle in the threaded projection and socket.

Figure 7:
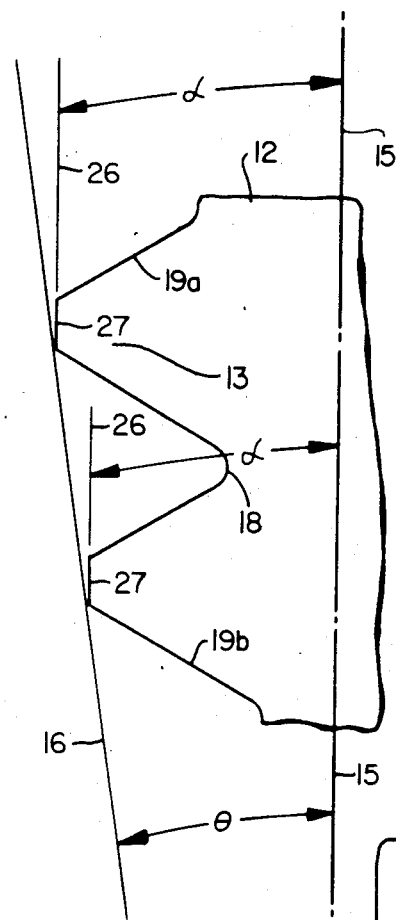
FIG. 7 is an enlargement of an area of FIG. 6 showing the detail of the preferred embodiment of the present invention thread configuration.

FIG. 7 is an enlargement of the indicated area of FIG. 6 showing the preferred embodiment of the thread configuration of the present invention in detail. Reference line 16 is drawn along the tops of the projection threads and forms the taper angle $\theta$ with the electrode column axis 15. Another reference line 26 drawn along each of the thread crests 27 forms the thread crest angle $\alpha$ with respect to the electrode axis. In this preferred embodiment, the thread crest is essentially parallel to the electrode axis when viewed in cross-section.

Figure 8:
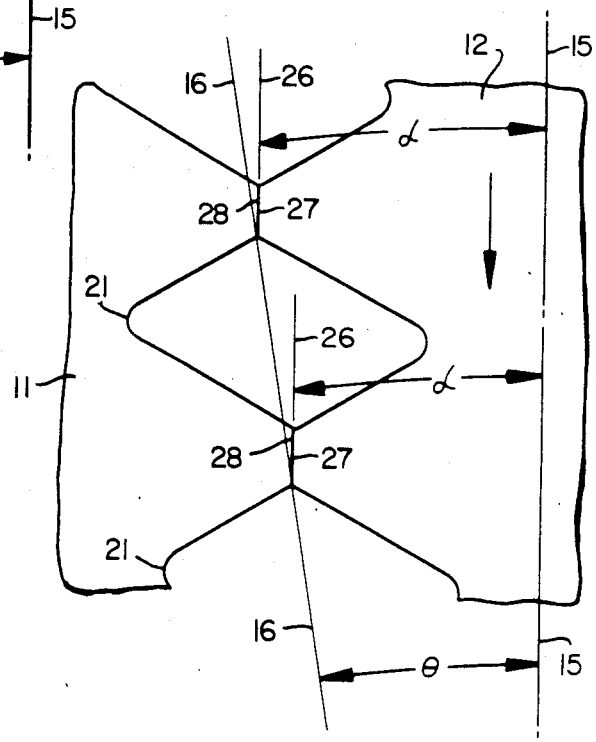
FIG. 8 illustrates thread crest jamming in improperly aligned electrode ends having the preferred embodiment of the thread configuration of the present invention.

FIG. 8 illustrates the thread configuration of the preferred embodiment of the present invention and shows a condition comparable to that of FIG. 4 wherein the projection thread crests 27 have not longitudinally aligned and mated with the socket thread roots 21 as the electrodes are joined. Instead, the projection thread crests 27 contact the socket thread crests 28. This condition can occur as the electrodes are brought together with or without rotation of one electrode relative to the other. However, in this preferred embodiment, the projection thread crest 27 and the socket thread crest 28 are essentially parallel to the axis of the electrode. The interfering threads are not in the same type of wedged engagement as shown in FIG. 4, the prior art jammed thread configuration. The threaded projection 12 may now be longitudinally moved either away from or, preferably, toward (arrow direction) the threaded socket 11 without rotation to eliminate the thread crest interference and place the respective thread crests and roots of the two electrode threaded sections into proper alignment. When one electrode is longitudinally moved relative to the other so that the thread crests and roots are in proper longitudinal alignment, they may be screwed together fully.

While there may still occur some friction between the thread crests as they are moved across one another to properly longitudinally align with their complimentary thread roots, the frictional force between the flat carbon or graphite surfaces is relatively low. The thread crest angle need not be precisely zero, but it is preferred that the deviation be no more than one-half (½) degree with respect to the electrode axis to allow crest movement without jamming. The chance of thread breakage is now significantly reduced when compared to the chance of breakage to the jammed thread crests of the prior art when they are moved against each other.

With the thread configuration of the preferred embodiment, if the electrodes are longitudinally advanced toward each other without rotation, the probability of the occurrence of thread crest interference will be significantly reduced with the present invention. As the electrodes are brought together without rotation, the threads will come in contact along the thread flanks (19 and 22 in FIG. 8) and cannot wedge along the thread crests (27 and 28). If, however, one of the electrodes is advanced while being rotated relative to the other to screw the electrodes together, the probability of the occurrence of thread crest interference is not materially different from that of the prior art thread configuration. The advantage of the preferred embodiment is then that thread breakage is less likely as the electrodes are jogged or moved to eliminate the interference.

Figure 9:
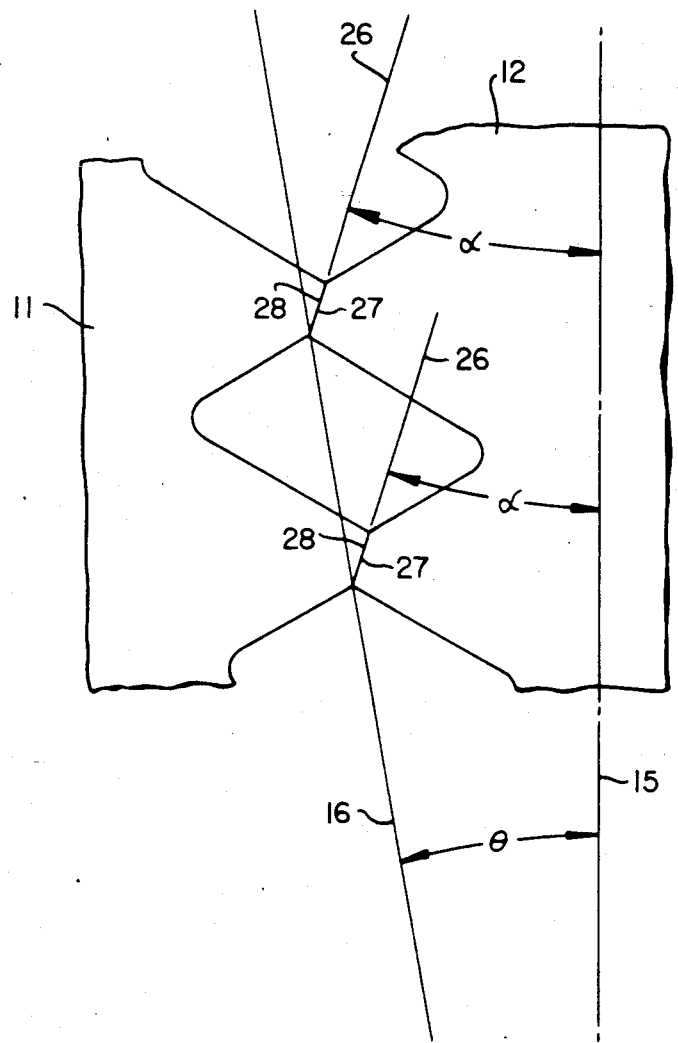
FIG. 9 illustrates an alternate embodiment of the thread configuration of the present invention.

FIG. 9 illustrates another embodiment of the thread configuration of the present invention. In this embodiment, the thread crest angle α relative to the electrode axis 15 is in a direction opposite to the thread crest angle of the prior art. If the prior art thread crest angle is taken as a positive value with respect to the electrode axis (a line parallel to the axis having an angle of zero degrees), then the thread crest angle α as shown in FIG. 9 is a negative value. If thread interference and jamming during joining do occur, as shown in FIG. 9, the threaded projection 12 can be longitudinally moved toward the threaded socket 11 to eliminate the interference with less risk of thread breakage. Movement or jogging of the two electrodes away from each other would not be desirable with this embodiment given the obvious thread interference in that direction.

Referring now to the present invention in its broadest aspect, the thread crest angle is less than the taper angle of the tapered threaded projection or socket, which angle also includes the negative thread crest angles as described in the alternate embodiment (as used herein, a "negative" thread crest angle is taken to be less than a "positive" thread crest angle, relative to the electrode axis). With a thread crest angle less than the taper angle, the probability of the occurrence of thread crest contact and interference during joining will be less than that of the prior art carbon-graphite thread configuration.

It is preferred, however, that in a tapered threaded projection or socket, the thread crest cross-section is either essentially parallel to the electrode axis or the thread crest angle is negative with respect to the electrode axis. With this thread configuration, not only will there be a significant reduction in the probability of thread crest contact and interference over that of the prior art, but it will also be possible to move the electrodes toward each other with less chance of thread breakage if thread contact occurs during joining.

It is still more preferred that, in a tapered threaded projection or socket, the thread crest cross-section is essentially parallel to the electrode axis. With this more preferred configuration, it will be possible to move the electrodes either toward or away from each other if thread crest contact occurs during joining. It is most preferred that the thread crest is perfectly parallel to the electrode axis.

It is important to point out that in practice the pin stock ordinarily has a greater coefficient of thermal expansion (CTE) in the transverse or radial direction than the electrode stock itself. This coefficient of thermal expansion relationship in conjunction with thread flank angles greater than zero, produces a desirable joint tightening effect when the electrode column is heated during the steel making process.

As electrode sections increase in size and weight, they become more unwieldy and difficult to join without thread damage. While the thread design of the present invention is useful in reducing the possibility of thread damage in any size electric arc furnace electrode, it is especially useful when used with electrodes of at least 14 in. (355 mm) diameter and weighing more than approximately 500 lbs. (230 kg). Connecting pins for these size electrodes are generally at least 6.975 in. (177 mm) in diameter.

Carbon and graphite electrodes having tapered threads and utilizing the thread design of the present invention can be made in a variety of sizes and thread configurations, and in both right hand and left hand designs. Standard pitches for tapered threaded graphite electrodes are 0.125 in. (3.18 mm), 0.250 in. (6.35 mm), and 0.333 in. (8.47 mm). Standard pitches for tapered threaded carbon electrodes are 25 mm, 30 mm, 40 mm, and 50 mm.

It will also be appreciated by those skilled in the art that the present invention is also useful in significantly reducing electrode thread damage when electrode joining is performed in a horizontal or any other non-vertical configuration.

It is of greatest advantage to utilize the thread configuration of the present invention in both the threaded projection and the threaded socket when making an electrode column joint. However, the use of the threaded projection or socket of the design of the present invention with a threaded socket or projection of the prior art configuration is still of some value. Of course, all other thread parameters, such as pitch, taper angle and thread height, must be complimentary and allow a proper connection to be made. Joint strength will not suffer when using the configuration of the present invention.

The following non-limiting example is set forth below for purposes of illustration.

EXAMPLE

Two 24 in. diameter by 90 in. length graphite electrodes were prepared and threaded on their ends in accordance with the thread configuration of the present invention. Each electrode weighed approximately 2500 lb. A tapered threaded socket was formed in an end of one electrode (female) and a complimentary tapered threaded projection was formed on an end of the other electrode (male). Each was given a taper angle of 25° relative to the electrode axis and a thread pitch of 0.333 in. (8.47 mm). Instead of having a thread crest angle equal to the taper angle, the threads of each had a thread crest angle of zero with respect to the longitudinal axis of the electrode when viewed in cross-section, i.e., the thread crest cross-sections were parallel to the electrode axis.

The male electrode was suspended from a crane and vertically axially aligned overhead the female electrode with the threaded projection and socket facing each other and axially spaced. The relative rotational orientation was randomly selected. The electrode threads were cleaned and the threaded portion of the male electrode was then lowered without rotation into the socket of the female electrode until contact between threads prevented further motion. The male electrode was thereafter manually rotated with a wrench and longitudinally axially advanced toward the female electrode to screw the threaded portions together. The respective threads of the male and female electrode mated and proper thread engagement was demonstrated. No thread crest interference or jamming occurred.

The two electrodes were then unscrewed and the joining procedure was repeated seven additional times. Each time the male electrode was rotated approximately 45° about its longitudinal axis from its previous relative rotational orientation with the female electrode before it was lowered toward the socket. This was done to test the tendency of the thread crests of the two electrodes to jam. In all cases, proper joint assembly was achieved without thread crest jamming and without subsequent thread damage that would interfere with joint tightness.

Since at least some occurrence of thread crest interference would be expected with the prior art carbon-graphite thead configuration, the absence of such interference and jamming in the above example illustrates the advantage of the present invention thread configuration over that of the prior art.

While this invention has been described with reference to specific embodiments, it will be recognized by those skilled in this art that variations are possible without departing from the spirit and scope of this invention and that it is intended to cover all changes and modifications of the invention disclosed herein for the purposes of illustration which do not constitute departure from the spirit and scope of the invention.

Having thus described the invention, what is claimed is:

1. A method for joining a first carbon or graphite electrode having a tapered threaded projection on at least one end to a second carbon or graphite electrode having a tapered threaded socket in at least one end, the projection and socket comprising a thread crest, thread flanks, and a thread root, the thread flank angles being greater than zero, and the thread crest being essentially parallel to the electrode axis, said method comprising the steps of:
   (a) axially aligning said first and second electrodes,
   (b) longitudinally advancing at least one of said electrodes toward the other electrode until the thread crest of said first electrode contacts the thread crest of said second electrode,
   (c) further longitudinally advancing at least one of said electrodes toward the other electrode until the thread crest of one electrode is in approximate longitudinal alignment with the thread root of the other electrode, and
   (d) still further longitudinally advancing at least one of said electrodes toward the other electrode while simultaneously rotating at least one of said electrodes relative to the other electrode about the electrode axis, the rates of said still further advance and rotation being coordinated to be the equivalent of the advancement of the electrode threads, until the threaded projection of said first electrode is screwed fully into the threaded socket of said second electrode.

2. A method for joining a first carbon or graphite electrode having a tapered threaded projection on at least one end to a second carbon or graphite electrode having a tapered threaded socket in at least one end, the projection and socket comprising a thread crest, thread flanks, and a thread root, the thread flank angles being greater than zero, and the thread crest having a negative angle relative to the electrode axis, said method comprising the steps of:
   (a) axially aligning said first and second electrodes,
   (b) longitudinally advancing at least one of said electrodes toward the other electrode until the thread crest of said first electrode contacts the thread crest of said second electrode,
   (c) further longitudinally advancing at least one of said electrodes toward the other electrode until the thread crest of one electrode is in approximate longitudinal alignment with the thread root of the other electrode, and
   (d) still further longitudinally advancing at least one of said electrodes toward the other electrode while simultaneously rotating at least one of said electrodes relative to the other electrode about the electrode axis, the rates of said still further advance and rotation being coordinated to be the equivalent of the advancement of the electrode threads, until the threaded projection of said first electrode is screwed fully into the threaded socket of said second electrode.

3. The method of claim 1 or 2 wherein in the step (b) longitudinal advancing, at least one of said electrodes is simultaneously rotated relative to the other electrode about the electrode axis, the rates of said advance and rotation being coordinated to be the equivalent of the advancement of the electrode threads, until the thread crests of said first and second electrode become jammed, thereby preventing further rotation.

4. The method of claim 1 or 2 wherein the weight of each of said first and second electrodes is greater than about 500 lbs.

5. The method of claim 1 or 2 wherein said first electrode is longitudinally advanced, further longitudinally advanced, and still further longitudinally advanced, respectively, in steps (b), (c), and (d).

6. A carbon or graphite electrode having on at least one end a tapered threaded projection comprising a thread crest, thread flanks, and thread root, the thread flank angles being greater than zero, and the thread crest angle being less than the taper angle of the tapered threaded projection relative to the electrode axis.

7. A carbon or graphite electrode having on at least one end a tapered threaded socket comprising a thread crest, thread flanks, and a thread root, the thread flank angles being greater than zero, and the thread crest angle being less than the taper angle of the tapered threaded socket relative to the electrode axis.

8. The electrode of claim 6 or 7 wherein the thread crest has a negative angle relative to the electrode axis.

9. The electrode of claim 6 or 7 wherein the thread crest is essentially parallel to the electrode axis.

10. The electrode of claim 6 or 7 wherein the electrode weight is greater than about 500 pounds.

11. A double ended, tapered, carbon or graphite connecting pin for joining two electrodes, said pin having on at least one end a thread comprising a thread crest, thread flanks, and a thread root, the thread flank angles being greater than zero, and the thread crest angle on at least one end being less than the taper angle of the pin relative to the pin axis.

12. The pin of claim 11 wherein the thread crest has a negative angle relative to the pin longitudinal axis.

13. The pin of claim 11 wherein the tread crest is essentially parallel to the pin longitudinal axis.

14. The pin of claim 11 wherein the pin is at least 6.975 inches in diameter.

* * * * *

UNITED STATES PATENT AND TRADEMARK OFFICE
CERTIFICATE OF CORRECTION

PATENT NO. : 4,679,206

DATED : July 7, 1987

INVENTOR(S) : W.H. Burwell

It is certified that error appears in the above-identified patent and that said Letters Patent is hereby corrected as shown below:

Column 5, line 25, "$\alpha$" should read --$\theta$--.

Column 5, line 46, "196" should read --19b--.

Column 6, line 1, "$\alpha$" should read --$\theta$--.

Signed and Sealed this

Fifth Day of December, 1989

Attest:

JEFFREY M. SAMUELS

*Attesting Officer*  *Acting Commissioner of Patents and Trademarks*